United States Patent
Chuc-Karmanski et al.

(10) Patent No.: US 9,407,118 B2
(45) Date of Patent: Aug. 2, 2016

(54) GENERATOR GAS SHIELD SUPPORT DEVICE AND METHOD OF REMOVING GENERATOR GAS SHIELD

(71) Applicant: General Electric Company, Schenectady, NY (US)

(72) Inventors: Artur Marcin Chuc-Karmanski, Mazowieckie (PL); Tony Lee Bombe, Orlando, FL (US); Marek Wojciechowski, Mazowieckie (PL); Wiktor Jan Wojciechowski, Dolnoslaskie (PL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/117,664

(22) PCT Filed: Feb. 28, 2013

(86) PCT No.: PCT/PL2013/000026
§ 371 (c)(1),
(2) Date: Nov. 14, 2013

(87) PCT Pub. No.: WO2014/133402
PCT Pub. Date: Sep. 4, 2014

(65) Prior Publication Data
US 2015/0364962 A1    Dec. 17, 2015

(51) Int. Cl.
*H02K 15/00*  (2006.01)
*H02K 5/04*   (2006.01)
(Continued)

(52) U.S. Cl.
CPC .. *H02K 5/04* (2013.01); *H02K 9/04* (2013.01); *H02K 9/12* (2013.01); *H02K 15/0006* (2013.01); *H02K 15/14* (2013.01); *Y10T 29/49817* (2015.01)

(58) Field of Classification Search
CPC ... H02K 15/00; H02K 15/0006; H02K 15/14; H02K 5/20; H02K 9/00; H02K 9/005; H02K 9/12; F01D 25/002
USPC .......... 310/52, 58–59, 64, 400, 411, 413, 415
See application file for complete search history.

(56) References Cited

U.S. PATENT DOCUMENTS 4,208,599 A * 6/1980 Armor ............... H02K 9/10
310/53
4,315,173 A * 2/1982 Calfo ............... H02K 9/00
310/260

(Continued)

FOREIGN PATENT DOCUMENTS

DE    1196778    * 7/1965    ............. H02K 15/00
DE    2350262    * 4/1975    ............. H02K 15/00

*Primary Examiner* — Burton Mullins
(74) *Attorney, Agent, or Firm* — Ernest G. Cusick; Hoffman Warnick LLC

(57) ABSTRACT

The disclosure includes a generator gas shield support device, and method of removing the generator gas shield using the support device. In one embodiment, the generator gas shield support device of a generator system includes a first support coupled to a generator rotor of the generator system. The first support of the generator gas shield support device is configured to releasably couple a first portion of a generator gas shield to the generator rotor of the generator system. The generator gas shield support device may also include a second support releasably coupled to the generator rotor. The second support is configured to support the first portion of the generator gas shield during a rotation of the generator rotor.

20 Claims, 10 Drawing Sheets

(51) Int. Cl.
*H02K 9/12* (2006.01)
*H02K 15/14* (2006.01)
*H02K 9/04* (2006.01)

(56) References Cited

U.S. PATENT DOCUMENTS

| | | | | |
|---|---|---|---|---|
| 4,383,191 A * | 5/1983 | Mizuyama | ............... | H02K 9/18 310/269 |
| 4,609,840 A * | 9/1986 | Eats | ............... | H02K 9/00 310/216.016 |
| 5,757,094 A * | 5/1998 | van Duyn | ............... | H02K 9/06 310/157 |
| 6,700,238 B1 | 3/2004 | Tong | | |
| 6,727,610 B2 * | 4/2004 | Ren | ............... | H02K 1/20 310/53 |
| 6,791,232 B2 | 9/2004 | Tong | | |
| 7,247,958 B2 * | 7/2007 | Iwashige | ............... | H02K 9/10 310/58 |
| 8,264,097 B2 * | 9/2012 | Numajiri | ............... | F03D 1/003 290/55 |
| 2002/0175590 A1 * | 11/2002 | Hediger | ............... | H02K 1/32 310/261.1 |
| 2014/0028138 A1 * | 1/2014 | Feher | ............... | F03D 1/001 310/156.08 |

* cited by examiner

GENERATOR GAS SHIELD SUPPORT DEVICE AND METHOD OF REMOVING GENERATOR GAS SHIELD

BACKGROUND OF THE INVENTION

1. Technical Field

The disclosure is related generally to a support device. More particularly, the disclosure is related to a generator gas shield support device for a generator system and a method of removing a generator gas shield using the support device.

2. Related Art

Conventional generator systems may be used for producing power (e.g., electricity). During operation and the production of power, conventional generator systems also generate high amounts of heat. The generated heat should be minimized within the generator system so the system can operate at maximum efficiency and/or avoid mechanical failure due to the increased temperature within the system. Minimizing the heat within the system may occur by flowing a cooling fluid (e.g., air, hydrogen, etc.) through the generator system.

Additionally, the generator system may include a gas shield coupled to an end of the generator housing. The gas shield typically may serve two purposes: (1) to separate a high temperature side of a rotor fan from a low temperature side, and (2) direct cooling air, pulled into the generator system by a rotor fan, through the generator system. That is, the gas shield, in combination with the rotor fan, may act as a gasket for generator systems.

Conventional gas shields are typically made up of two halves or portions that are coupled to the generator housing. The two portions of the conventional gas shields may be bolted together by a joint plate positioned at either adjoining edge. When maintenance is performed on the generator system, each portion of the gas shield can be removed in order to allow operators access to the internal components of the system. Removal of the gas shield can be difficult, and time consuming for the operators, as each portion of the gas shield may weigh in excess of 2000 pounds. Additionally, the lower portion of the gas shield (e.g., portion positioned below the rotor) may be very difficult to access due to spatial restraints in the configuration of the generator system. That is, the lower portion of the gas shield may be less accessible than the upper portion by comparison and may require an operator to be positioned in confined space between the lower portion of the gas shield and the generator housing, in order to remove the lower portion from the generator housing. This process of removal may be time consuming for the operator because of the weight of the gas shield and the restricted workable space of the generator system.

BRIEF DESCRIPTION OF THE INVENTION

A generator gas shield support device of a generator system is disclosed. In one embodiment, the generator gas shield support device includes: a first support coupled to a generator rotor of the generator system, the first support configured to releasably couple a first portion of a generator gas shield to the generator rotor of the generator system.

A first aspect of the invention includes a generator gas shield support device of a generator system. The generator gas shield support device includes: a first support coupled to a generator rotor of the generator system, the first support configured to releasably couple a first portion of a generator gas shield to the generator rotor of the generator system.

A second aspect of the invention includes a method of removing a gas shield from a generator system. The method includes: removing a first portion of the gas shield from the generator system, the first portion positioned substantially above a rotor of the generator system; releasably coupling a second portion of the gas shield to the rotor of the generator system using a first support, the second portion positioned substantially below the rotor of the generator system; rotating the rotor and the second portion of the gas shield to position the second portion of the gas shield substantially above the rotor of the generator system; and uncoupling the second portion of the gas shield from the rotor of the generator system.

A third aspect of the invention includes a generator system having: a housing; a gas shield releasably coupled to the housing; a rotor positioned within the housing and passing through the gas shield; and a gas shield support device including: a first support configured to releasably couple a first portion of the gas shield to the rotor.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
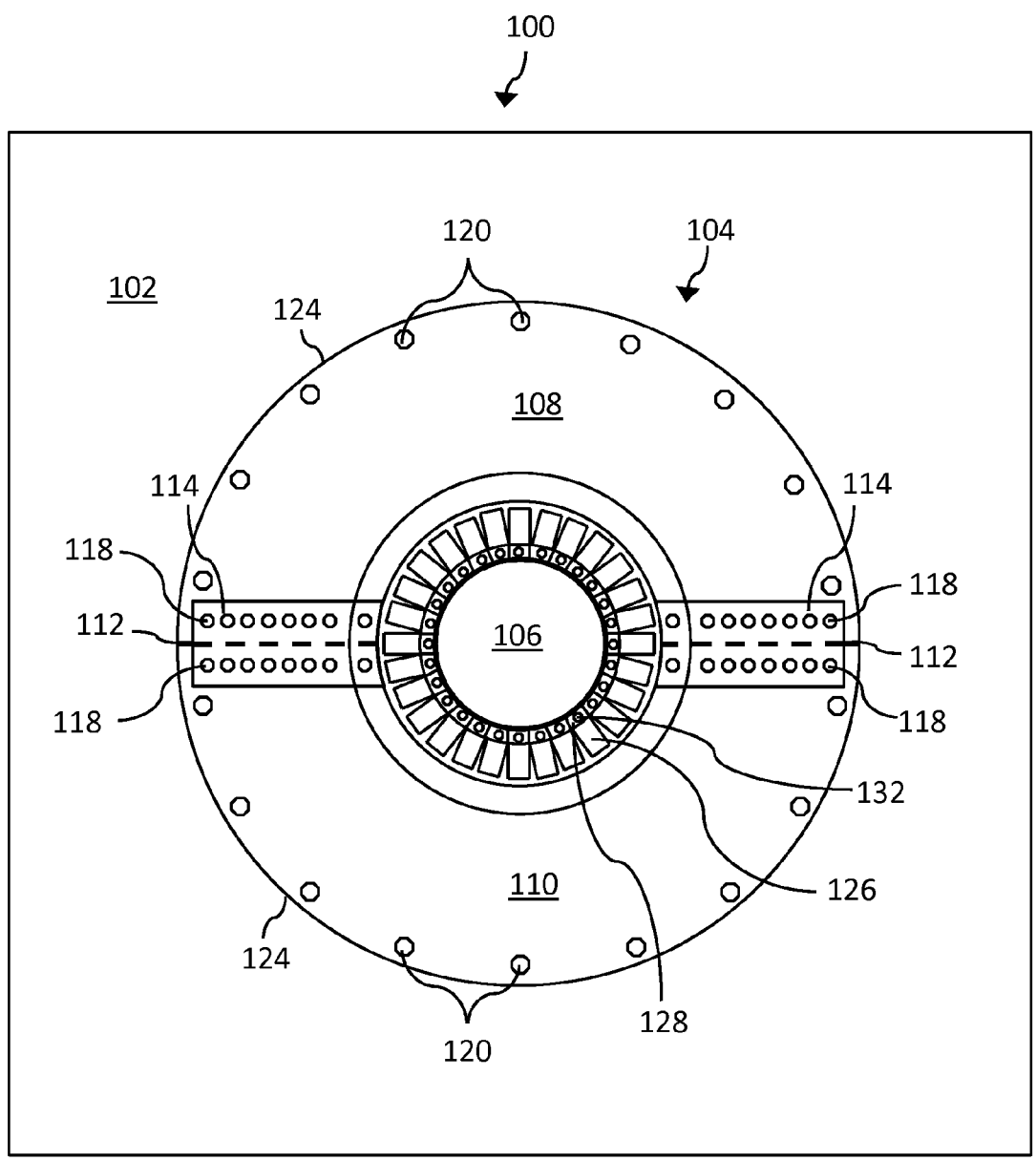
FIG. 1 shows a front perspective view of a generator system including a gas shield, according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention related to a support device. Specifically, as described herein, aspects of the invention relate to a generator gas shield support device for a generator system.

Figure 2:
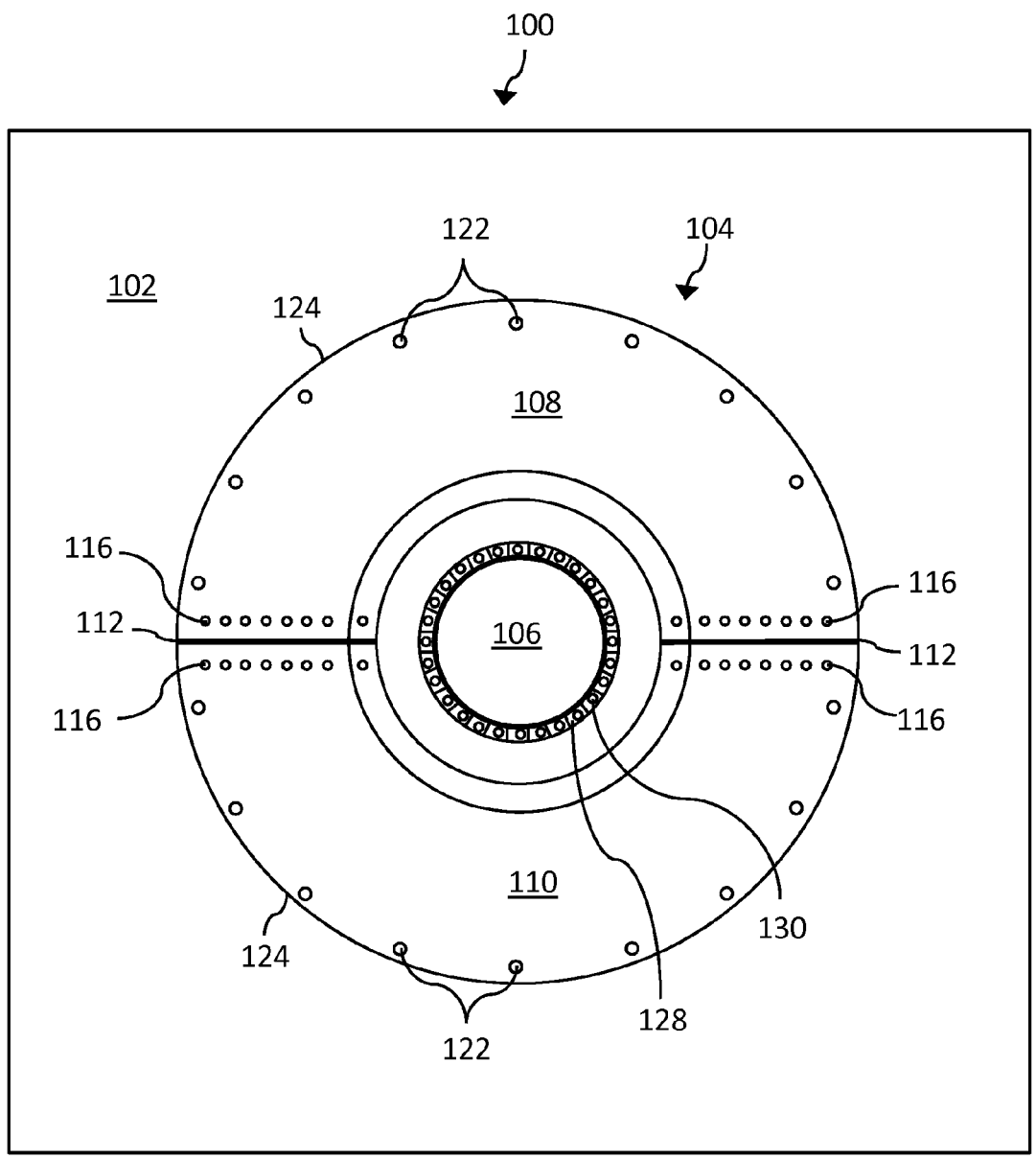
FIG. 2 shows a front perspective view of a generator system including a gas shield, according to an alternative embodiment of the invention.

Turning to FIGS. 1 and 2, a front perspective view of a generator system including a generator gas shield is shown according to various embodiments of the invention. Specifically, FIG. 1 shows a two-portion gas shield of a generator system in an assembled configuration, and FIG. 2 shows the same two-portion gas shield of the generator system in a substantially unassembled configuration. Generator system 100 may include any conventional generator system for generating power. As such, basic functionality of the majority of generator system 100 and generator system components, as shown in FIGS. 1 and 2, is provided herein for clarity. Generator system 100 may include a housing 102, a gas shield 104 releasably coupled to housing 102, and a rotor 106 positioned within housing 102 and passing through gas shield 104. In an embodiment, as shown in FIG. 1, gas shield 104 may include an upper portion 108, positioned substantially above rotor 106, and a lower portion 110, positioned substantially below rotor 106. Upper portion 108 and lower portion 110 of gas shield 104 may be adjoined at horizontal coupling joint 112. More specifically, the ends of each of upper portion 108 and lower portion 110 may come in contact at horizontal coupling joint 112 to form gas shield 104.

In an embodiment, as shown in FIG. 1, upper portion 108 and lower portion 110 may be coupled via a joint plate 114. Joint plate 114 may include a plurality of apertures aligned with a plurality of apertures 116 (FIG. 2) formed on each end of upper portion 108 and lower portion 110 of gas shield 104. The plurality of apertures of joint plate 114 and the plurality of apertures 116 (FIG. 2) of upper portion 108 and lower portion 110 of gas shield 104 may be configured to receive bolts 118 in order to couple upper portion 108 to lower portion 110. In an embodiment, as shown in FIG. 1, joint plate 114 may substantially cover horizontal coupling joint 112, and may be disposed over a portion of upper portion 108 and lower portion 110 of gas shield 104 to ensure upper portion 108 and lower portion 110 are securely coupled. In an alternative embodiment (not shown), joint plate 114 may couple upper portion 108 and lower portion 110 to form gas shield 104 using any now known or later developed releasable coupling technique, e.g., fasteners, screws, snap-fit, etc.

As shown in FIGS. 1 and 2, gas shield 104 may be releasably coupled to housing 102 of generator system 100 by a plurality of bolts 120 (FIG. 1) positioned in a plurality of apertures 122 (FIG. 2) formed on gas shield 104. More specifically, as shown in FIGS. 1 and 2, the plurality of apertures 122 (FIG. 2) may be formed substantially adjacent to an outer circumference 124 of upper portion 108 and lower portion 110. The plurality of apertures 122 (FIG. 2) may be aligned with a plurality of apertures formed on housing 102 (not shown), and may be configured to receive bolts 120 for releasably coupling upper portion 108 and lower portion 110 of gas shield 104 to housing 102. In alternative embodiments (not shown), upper portion 108 and lower portion 110 of gas shield 104 may be coupled to housing 102 using any now known or later developed releasable coupling technique, e.g., fasteners, screws, snap-fit, etc.

Also shown in FIG. 1, generator system 100 may include a plurality of fan blades 126 positioned on the outer circumference of rotor 106. More specifically, as shown in FIGS. 1 and 2, the plurality of fan blades 126 (FIG. 1) may be releasably coupled to a fan blade support ring 128 (FIG. 2) coupled to rotor 106. In an embodiment, as shown in FIG. 2, support ring 128 of rotor 106 may include a plurality of rotor apertures 130 for receiving a bolt 132 (FIG. 1) used to couple each of the plurality of fan blades 126 to support ring 128. In alternative embodiments of the invention, the plurality of fan blades 126 may be coupled to support ring 128 of rotor 106 by a variety of mechanical coupling techniques, including, but not limited to: dovetail connectors, fasteners, snap-fits, screws, etc.

As discussed above, gas shield 104 and the plurality of fan blades 126 of rotor 106 may work in conjunction to improve the efficiency of generator system 100 during operation of generator system 100. More specifically, gas shield 104 may separate a high pressure/temperature side of generator system 100 from a low pressure/temperature side, as the plurality of fan blades 126 remove warm air from housing 102, or bring cool air into housing 102 for cooling generator system 100 during operation of generator system 100.

Figure 3:
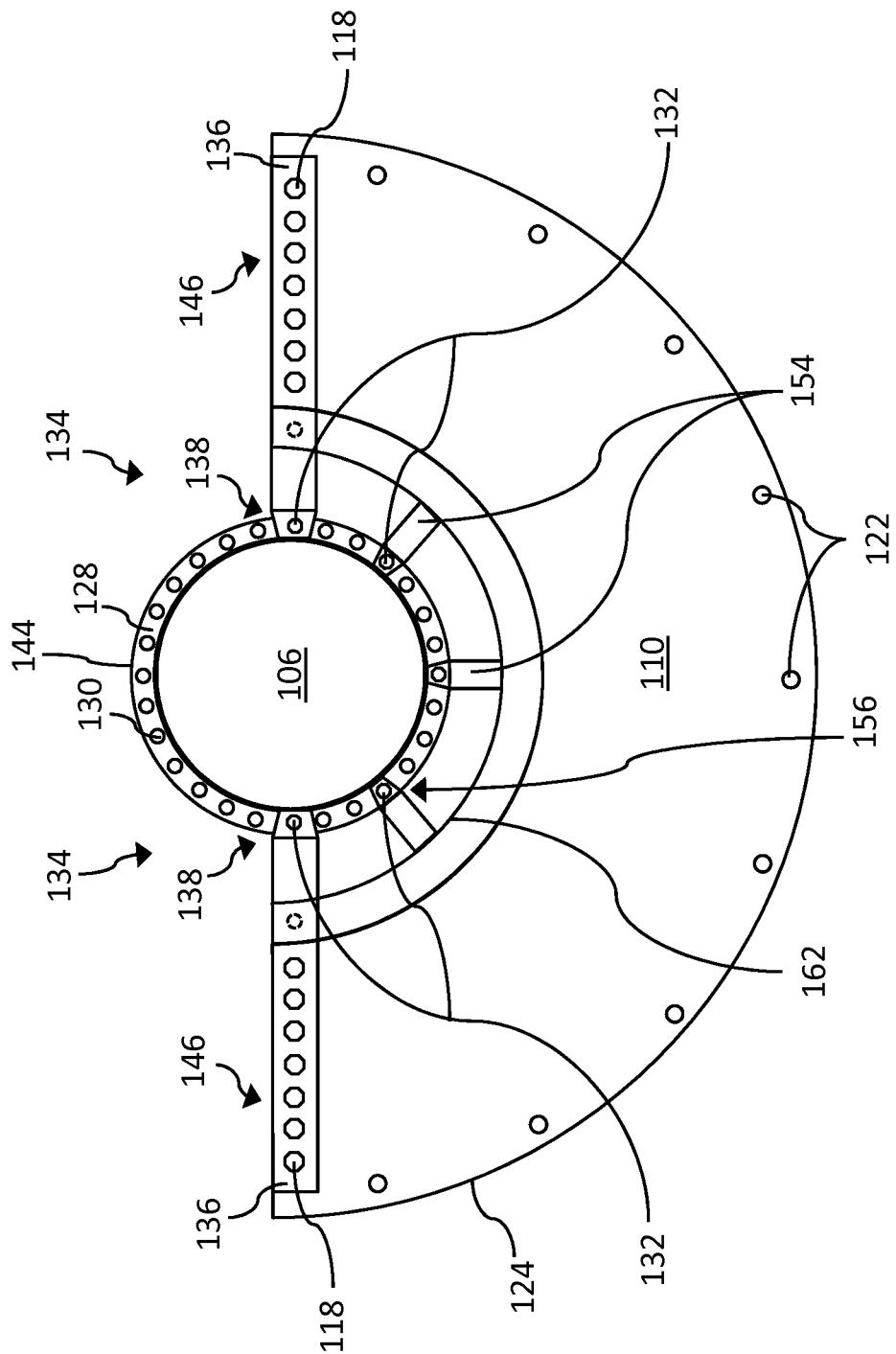
FIG. 3 shows a perspective view of a lower portion of a generator gas shield including a gas shield support device, according to embodiments of the invention.

Turning to FIG. 3, a perspective view of a lower portion 110 of gas shield 104 including a gas shield support device 134 is shown according to embodiments of the invention. FIG. 3 shows a gas shield 104 that may have undergone initial steps of a process for removing gas shield 104 from generator system 100, as described in detail herein. More specifically, with comparison to FIG. 1, FIG. 3 does not include: upper portion 108 of gas shield 104, the plurality of fan blades 126 coupled to support ring 128, and joint plate 114 has been replaced by gas shield support device 134, as described herein. In an embodiment as shown in FIG. 3, gas shield support device 134 of generator system 100 may include a first support 136 coupled to rotor 106 of generator system 100. First support 136 may be configured to releasably couple first portion 110 of generator gas shield 104 to rotor 106 of generator system 100. As previously discussed, the plurality of rotor apertures 130 may be configured to couple at least one of the plurality of fan blades 126 (FIG. 1) to rotor 106 during operation of generator system 100. Prior to coupling gas shield support device 134 to rotor apertures 130 of ring support 128, the plurality of fan blades 126 (FIG. 1) must be removed. In an embodiment, and as discussed in more detail herein, lower portion 108 may first be uncoupled from housing 102 and then the plurality of fan blades 126 (FIG. 1) may be uncoupled from support ring 128 of rotor 106 by uncoupling each individual fan blade positioned above rotor 106, and rotating rotor 106 to allow access to the portion of the plurality of fan blades 126 positioned below rotor 106. In an embodiment, as shown in FIG. 3, first support 136 of gas shield support device 134 may be coupled to at least one of the plurality of rotor apertures 130 of ring support 128 coupled to rotor 106 after the plurality of fan blades 126 are uncoupled from ring support 128. More specifically, as shown in FIG. 3, first support 136 may include a first end 138 coupled to rotor 106, such that first end 138 of first support 136 is coupled to at least one of the plurality of rotor apertures 130 of rotor 106. As shown in FIG. 3, and with reference to FIGS. 4 and 5, first end 138 of first support 136 may include at least one rotor hole 140, configured to substantially align with corresponding rotor aperture(s) 130 positioned on support ring 128 of rotor 106. The at least one rotor hole 140 of first end 138 may receive bolt 132 (FIG. 3) for releasably coupling first support 136 to rotor 106 at first end 138.

Figure 4:
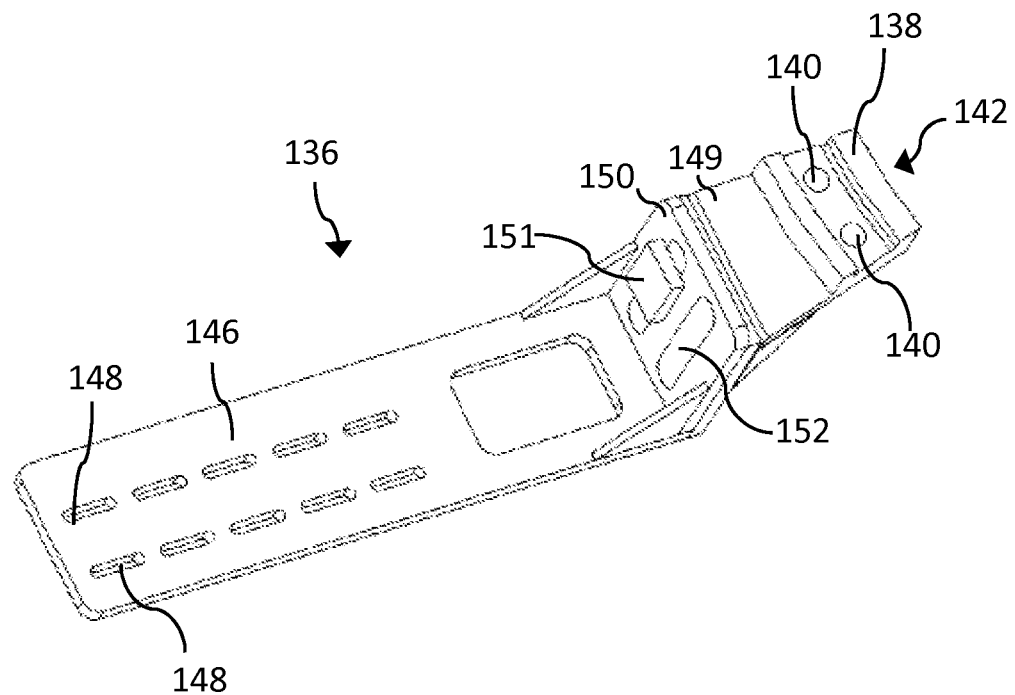
FIG. 4 shows a rear perspective view of a first support of a gas shield support device, according to embodiments of the invention.
Figure 5:
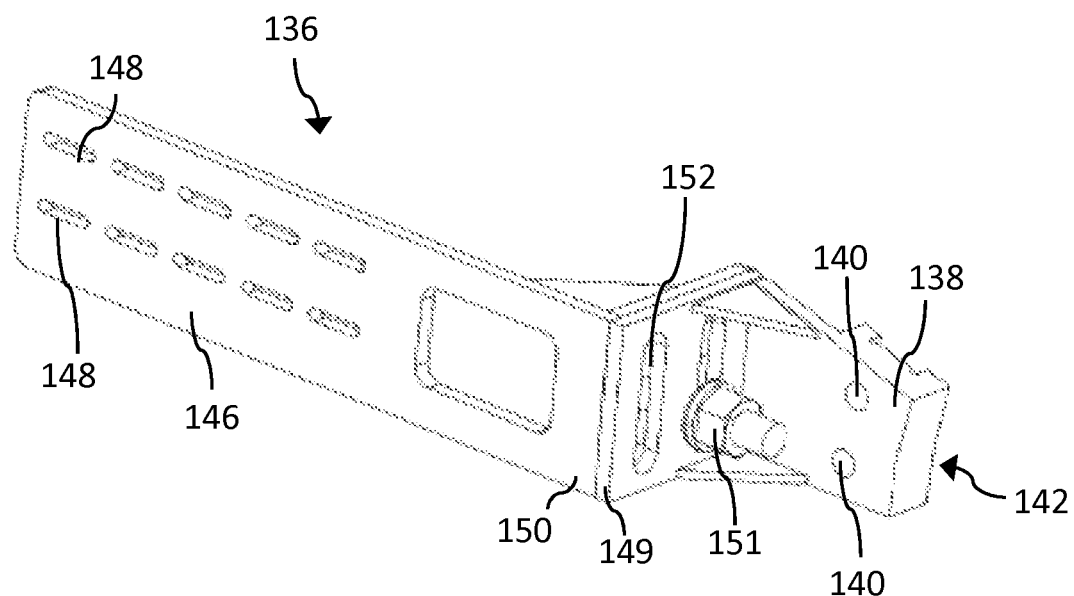
FIG. 5 shows a front perspective view of a first support of a gas shield support device, according to embodiments of the invention.

Briefly turning to FIGS. 4 and 5, first end 138 of first support 136 may also include an arc profile 142 substantially similar to an arc profile of a portion of rotor 106. More specifically, first end 138 may include an arc profile that is substantially similar to the arc profile of an outer circumference 144 (FIG. 3) of rotor 106. By including an arc profile 142 in first end 138, first support 136 may be securely coupled to support ring 128 and may abut outer circumference 144 of rotor 106 to substantially prevent movement of first support 136.

Returning to FIG. 3, and with continued reference to FIGS. 4 and 5, first support 136 may be coupled to the plurality of apertures 116 on lower portion 110 of gas shield 104. As previously discussed, the plurality of apertures 116 may be configured to couple joint plate 114 (FIG. 1) to lower portion 110 of gas shield 104 during operation of generator system 100. More specifically, as shown in FIG. 3, first support 136 may include a second end 146, opposite first end 138, coupled to lower portion 110 of gas shield 104, such that second end 146 of first support 136 may be coupled to the plurality of apertures 116 (FIG. 2) of lower portion 110 of gas shield 104. As shown in FIG. 3, and with reference to FIGS. 4 and 5, second end 146 of first support 136 may include a plurality of slot apertures 148, configured to substantially align with the plurality of apertures 116 positioned on lower portion 110 of gas shield 104. The plurality of slot apertures 148 of second end 146 may receive bolts 118 (FIG. 1) for releasably coupling first support 136 to gas shield 104 at second end 146. As shown in FIGS. 4 and 5, the plurality of slot apertures 148 may be substantially elongated apertures, so a single first support (e.g., first support 136) may be coupled to a variety of distinct gas shields 104 having apertures 116 spaced different distances apart.

Turning to FIGS. 4 and 5, a front and rear perspective view of first support 136 of gas shield support device 134 is shown according to various embodiments of the invention. In an embodiment, second end 146 of first support 136 may be positioned in a non-planer alignment with first end 138 of first support 136. That is, as shown in FIGS. 4 and 5, second end 146 of first support 136 may be offset from first end 138 of first support 136 where gas shield 104 is in a non-planer alignment with ring support 128 of rotor 106. As shown in FIGS. 4 and 5, second end 146 of first support 136 may be positioned inwardly of first end 138 of first support 136 when coupled to rotor 106 and lower portion 110 of gas shield 104. In this case, first support 136, as shown in FIGS. 4 and 5, may be used by a generator system (e.g., generator system 100), where support ring 128 of rotor 106 may be positioned outside of housing 102, and gas shield 104 may be coupled to an outer surface of housing 102 of generator system 100. That is, first support 136, as shown in FIGS. 4 and 5, may be used by a generator system (e.g., generator system 100) where gas shield 104 may be positioned downstream from support ring 128 of rotor 106. In an alternative embodiment, not shown, second end 146 of first support 136 may be positioned outward of first end 138 when coupled to rotor 106 and lower portion 110 of gas shield 104. In this case, first support 136 may be used by a generator system (e.g., generator system 100), where support ring 128 of rotor 106 may be positioned within housing 102, and gas shield 104 may be coupled to an outer surface of housing 102 of generator system 100. That is, first support 136 may be used by a generator system (e.g., generator system 100) where support ring 128 of rotor 106 may be positioned downstream from gas shield 104. In an additional alternative embodiment (not shown), second end 146 of first support 136 may be positioned in a planer alignment with first end 138 of first support 136, and may be used by a generator system (e.g., generator system 100) where support ring 128 of rotor 106 and gas shield 104 are in planer alignment with one another.

Also shown in FIGS. 4 and 5, second end 146 of first support 136 may be adjustable in both a vertical and horizontal direction. More specifically, as shown in FIGS. 4 and 5, first support 136 may include a first component 149 and a second component 150, coupled together by a screw-and-nut set 151. More specifically, as shown in FIGS. 4 and 5, first and second components 149, 150 may include a plurality of adjustment slots 152 configured to receive screw-and-nut set 151 for coupling and adjusting the positioning of first and second components 149, 150. That is, the plurality of adjustment slots 152 may be positioned in a horizontal direction on first component 149 including first end 138, and a plurality of adjustment slots 152 may be positioned in a vertical direction on second component 150, including second end 146. As a result, second end 146 of first support 136 may be adjusted in a vertical and/or horizontal direction dependent, at least in part, on the positioning of the screw-and-nut set 151 within the plurality of adjustment slots 152 of first and second components 149, 150.

Figure 6:
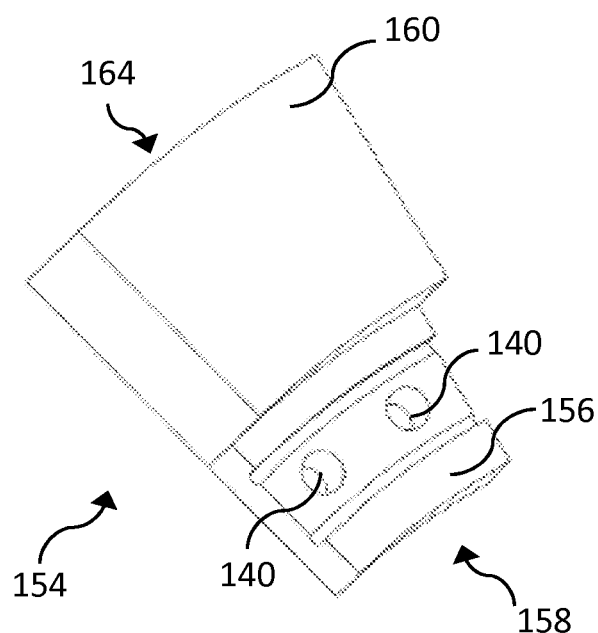
FIG. 6 shows a rear perspective view of a second support of a gas support device, according to embodiments of the invention.

Returning to FIG. 3, and with reference to FIG. 6, gas shield support device 134 may also include a second support 154 releasably coupled to rotor 106. Second support 154 may be configured to support lower portion 110 of gas shield 104 during rotation of rotor 106 during the removal of gas shield 104 from housing 102, as discussed herein. In an embodiment, as shown in FIG. 3, second support 154 may be coupled to at least one of the plurality of rotor apertures 130, distinct from the at least one of the plurality of rotor apertures 130 coupling first support 134 to rotor 106. More specifically, as shown in FIG. 3, a first end 156 of second support 154 couples to at least one of the plurality of rotor apertures 130 of support ring 128 of rotor 106. As similarly discussed with respect to first end 138 of first support 136, first end 156 of second support 154 may include at least one rotor hole 140 (FIG. 6) configured to align with appropriate rotor aperture(s) 130 positioned on support ring 128 of rotor 106. As shown in FIG. 3, the at least one rotor hole 140 of first end 156 of second support 154 may receive bolt 132 for releasably coupling second support 154 to rotor 106 at first end 156. In an embodiment, as shown in FIG. 6, first end 156 of second support 154 may include an arc profile 158 substantially similar to an arc profile of a portion of rotor 106. More specifically, first end 156 of second support 154 may include arc profile 158 that is substantially similar to the arc profile of outer circumference 144 (FIG. 3) of rotor 106. As similarly discussed above, by including arc profile 158 in first end 156 of second support 154, second support 154 may be securely coupled to support ring 128 and may abut outer circumference 144 of rotor 106 to substantially prevent movement of second support 154.

Also shown in FIGS. 3 and 6, second support 154 may include a substantially curved second end 160 (FIG. 6) configured to abut an inner edge 162 (FIG. 3) of lower portion 110 of gas shield 104. More specifically, substantially curved second end 160 of second support 154 may contact an inner edge 162 (FIG. 3) of lower portion 110 of gas shield 104 to provide support to lower portion 110 of gas shield 104 during rotation of rotor 106, as discussed herein. As shown in FIG. 6, substantially curved second end 160 of second support 154 may include an arc profile 164 substantially similar to an arc profile of a portion of inner edge 162 of lower portion 110 of gas shield 104. Arc profile 164 may allow substantially curved second end 160 of second support 154 to completely abut inner circumference 162, and provide additional support to lower portion 110 of gas shield 104 during rotation of the rotor 106 during the removal process of gas shield 104, discussed herein. Additionally, second support 154 may substantially mitigate some of the strain put on first support 136 as lower portion 110 of gas shield 104 is rotated with rotor 106 after being coupled thereto.

As shown in FIG. 3, first support 136 and second support 154 may be coupled to support ring 128 of rotor 106 using a single bolt 132 positioned within one rotor aperture 130 of support ring 128. It is understood that first support 136 and second support 154 may be coupled to support ring 128 of rotor 106 using a plurality of bolts 132. More specifically, as shown in FIGS. 4-6, first support 136 and second support 154 may include two rotor holes 140 for receiving bolts 132 and for coupling first support 136 and second support 154 to support ring 128. By using a plurality of rotor holes 140 and bolts 132, rotor apertures 130 of support ring 128 may avoid substantial strain and/or stress during the removal process of lower portion 110 of gas shield 104.

Figure 7:
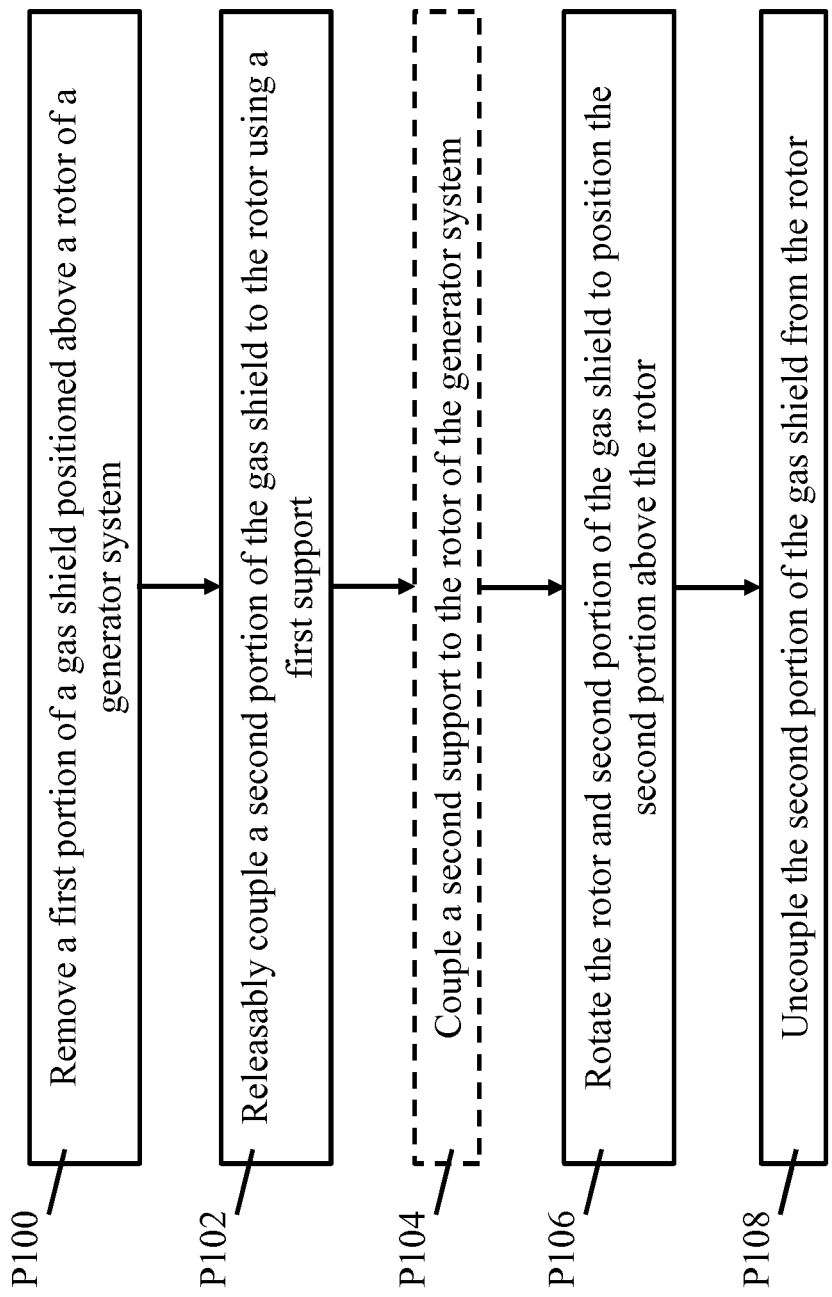
FIG. 7 shows a method flow diagram illustrating processes of removing a gas shield from a generator system, according to embodiments of the invention.

Turning to FIG. 7, a flow diagram is shown illustrating processes of removing gas shield 104 from generator system 100, according to embodiments of the invention. The process flow in FIG. 7 will be referred to in conjunction with FIGS. 8-11, which illustrate lower portion 110 of generator gas shield 104 undergoing removal from generator system 100.

Figure 8:
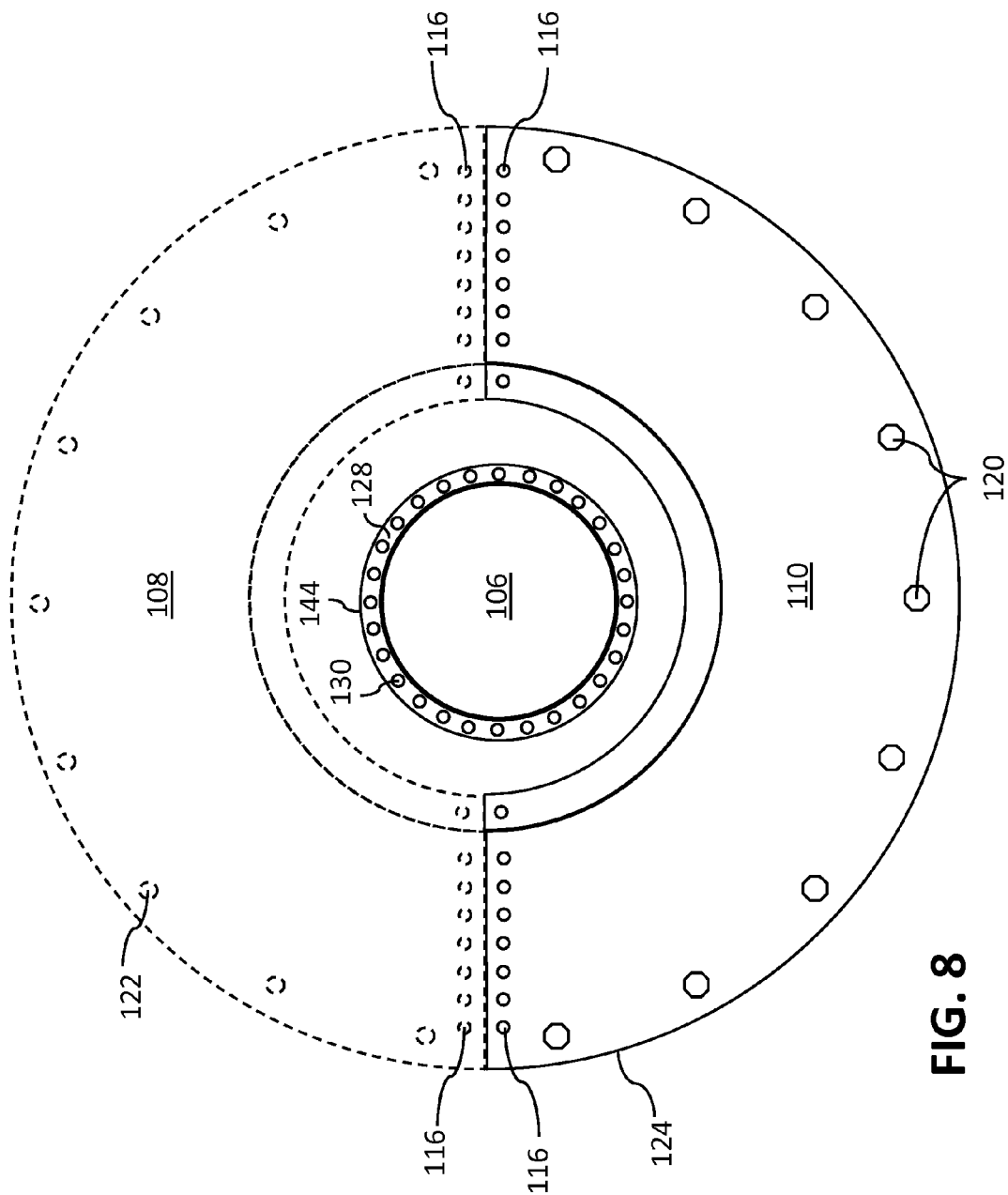
FIGS. 8-11 shows a perspective view of a lower portion of a generator gas shield undergoing a method of removing as illustrated by flow diagram FIG. 7, according to embodiments of the invention.

Turning to FIG. 7, in process P100 a first portion (e.g., upper portion 108) of gas shield 104 from generator system 100 is removed. First portion, or upper portion 108 as shown in phantom in FIG. 8, may be positioned substantially above rotor 106 of generator system 100 (FIG. 1) during normal operation of generator system 100. As shown in FIG. 8, a preliminary process may include removing joint plate 114 coupling upper portion 108 of gas shield 104 to lower portion 110 of gas shield 104 prior to the removing of upper portion 108 of gas shield 104. More specifically, as shown in FIG. 8, upper portion 108, shown in phantom, and lower portion 110 of gas shield 104 may be uncoupled from one another by removing joint plate 114 coupled to the plurality of apertures 116 on each end of upper portion 108 and lower portion 110 of gas shield 104. As discussed in more detail herein, bolts 120 (FIG. 1) may still be positioned within the plurality of apertures 122 for coupling upper portion 108 to housing 102 of generator system 100 prior to removing upper portion 108 of gas shield 104.

Additionally, as shown in FIG. 8, a preliminary process may include removing the plurality of fan blades 126 coupled to rotor 106 of generator system 100 prior to the removing of upper portion 108 of gas shield 104, as performed in process P100. More specifically, as shown in FIG. 8, the plurality of fan blades 126 may be uncoupled from support ring 128 of rotor 106 before performing process P1. By removing the plurality of fan blades 126 coupled to rotor 106 before removing upper portion 108 of gas shield 104, a user (e.g., generator operator) may substantially prevent the risk of damaging the plurality of fan blades 126 during the removal of upper portion 108, which may be heavy, large in size, and cumbersome to maneuver during the removal process. In an alternative embodiment, where the plurality of fan blades 126 are positioned within housing 102 of generator system 100, process P100 may be performed prior to removal of the plurality of fan blade 126. By removing upper portion 108 of gas shield 104 first, a user (e.g., generator operator) may remove the plurality of fan blades 126 more easily, without spatial restriction or limited access to the plurality of fan blades 126 because of upper portion 108. Once upper portion 108 and lower portion 110 are uncoupled from one another and the plurality of fan blades 126 are removed from generator system 100, bolts 120 (FIG. 1) coupling upper portion 108 to generator housing 102 (FIG. 1) may be removed from upper portion 108. Once bolts 120 (FIG. 1) are all removed from upper portion 108 of gas shield 104, upper portion 108 may be completely uncoupled from housing 102 of generator system 100 and may be removed from generator system 100. Upper portion 108 of gas shield 104 may be removed from generator system 100 by any conventional technique, including, but not limited to, an overhead crane, a hydraulic lift, or other user removal techniques. For example, a user (e.g., generator operator) may connect a first end of a chain of an overhead crane system to upper portion 108 prior to removing bolts 120 from housing 102. Once the chain is securely attached to upper portion 108, by way of a hook, clamp or other conventional attaching mechanism, bolts 120 of upper portion 108 may be removed from housing 102. Once bolts 120 are removed, the overhead crane system may then remove the uncoupled upper portion 108 of gas shield 104 from generator system 100 by lifting the upper portion 108 above generator system 100. As shown in FIG. 8, and as further discussed herein, bolts 120 coupling lower portion 110 of gas shield 104 to housing 102 (FIG. 1) may still be positioned in the plurality of apertures 122 (FIG. 2) positioned on lower portion 110. That is, during the removing process of upper portion 108 of gas shield 104 (e.g., process P100), lower portion 110 of gas shield 104 may be coupled to housing 102 of generator system 100 by bolts 120.

Figure 9:
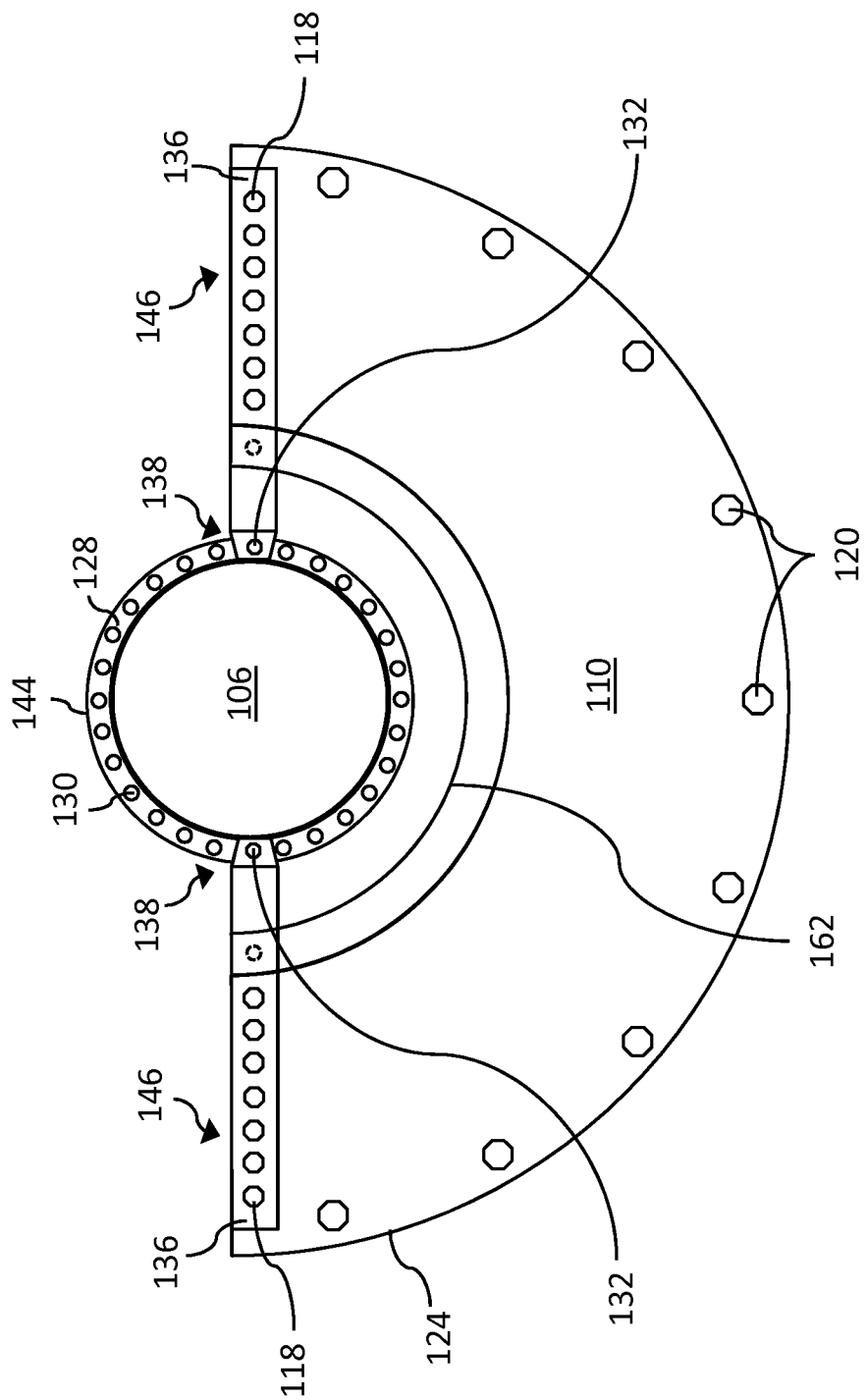

Following process P100, in process P102 a second portion (e.g., lower portion 110) of gas shield 104 is releasably coupled to rotor 106 of generator system 100 using first support 136. The second portion, or lower portion 110, may be positioned substantially below rotor 106 of generation system 100. More specifically, as shown in FIG. 9, the releasably coupling of lower portion 110 of gas shield 104 to rotor 106 of generator system 100 may include replacing joint plate 114 coupled to lower portion 110 of gas shield 104 with first support 136, and coupling first support 136 to rotor 106 of generator system 100. As discussed herein, and shown in FIG. 9, second end 146 of first support 136 may be coupled to lower portion 110 of gas shield 104 by positioning bolt 118 within an appropriate slot aperture 148 aligned with the plurality of apertures 116 positioned on lower portion 110. Additionally as shown in FIG. 9, and discussed above, a first end 138 of first support 136 may be coupled to rotor 106 by fastening bolt 132 within the at least one rotor hole 140 and at least one rotor aperture 130 positioned on support ring 128 of rotor 106.

Figure 10:
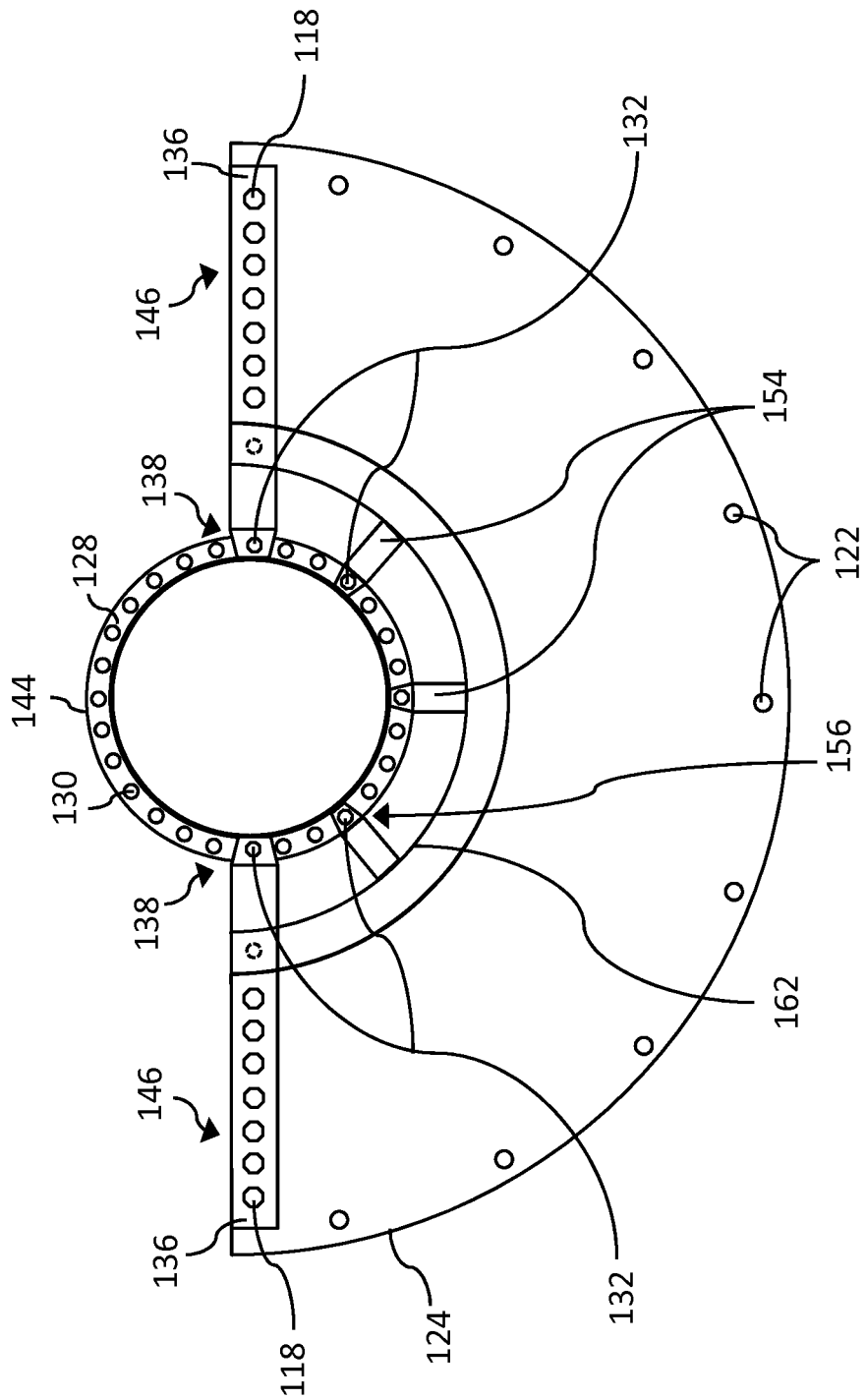

As shown in FIG. 10, an optional process P104, shown in phantom, may be performed after process P102 is performed and before process P106 (discussed herein) is performed. More specifically, in optional process P104 second support 154 is coupled to rotor 106 prior to rotating rotor 106 and lower portion 110 of gas shield 104. As shown in FIG. 10, second support 154 is configured to support lower portion 110 of gas shield 104 during the rotating of rotor 106 and lower portion 110 of gas shield 104 (e.g., process P106). As previously discussed, and as shown in FIG. 10, second support 154 may be coupled to rotor support 128 of rotor 106 by fastening bolt 132 within at least one rotor hole 140 of first end 156 of second support 154 and at least one rotor aperture 130 positioned on support ring 128 of rotor 106.

Figure 11:
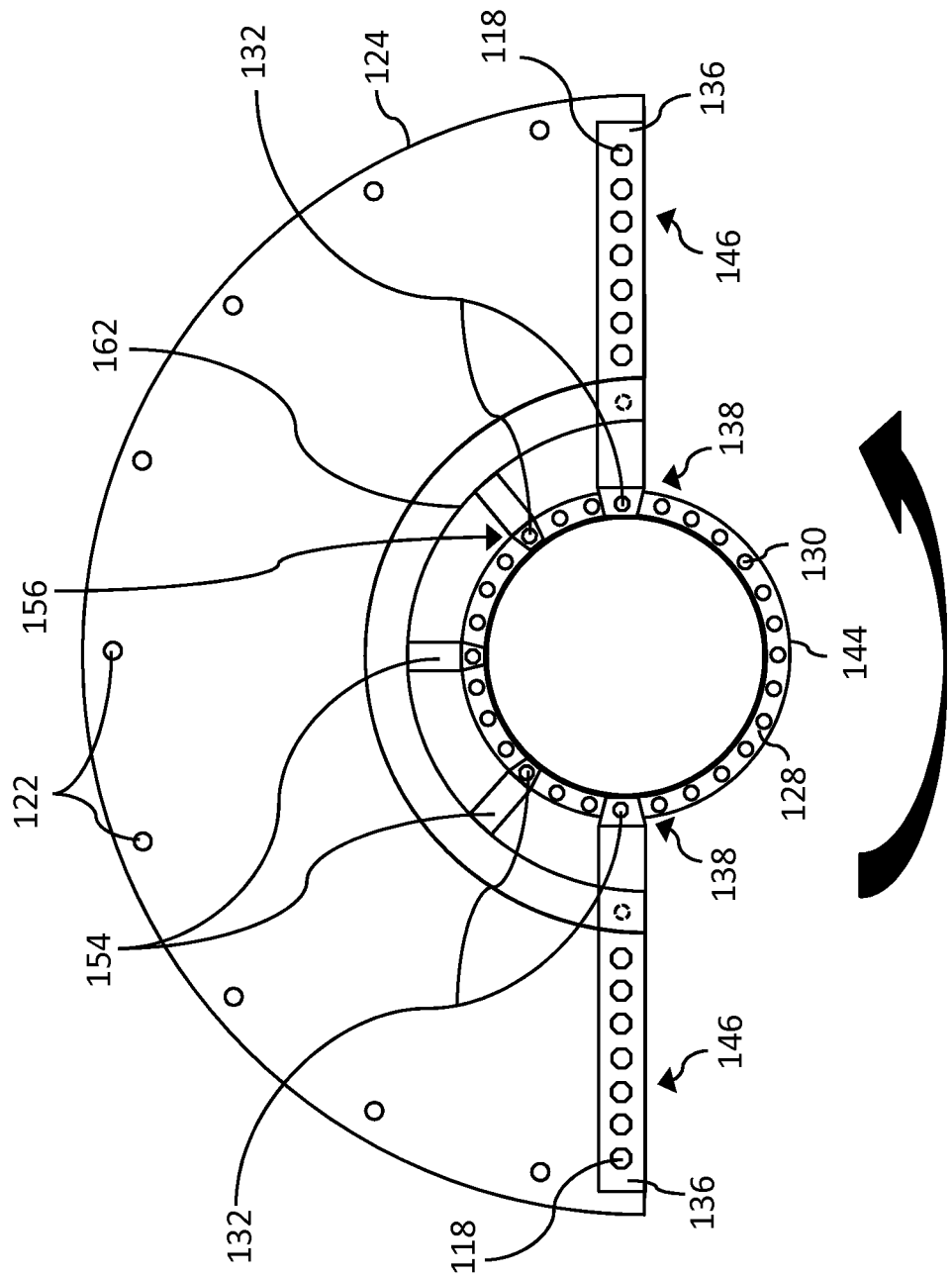

Following process P102, or the optional process P104 described with reference to FIG. 10, in process P106 rotor 106 and lower portion 110 of gas shield 104 are rotated to position the lower portion 110 of gas shield 104 substantially above rotor 106 of generator system 100. More specifically, as shown in FIGS. 11 and 12, after releasably coupling lower portion 110 of gas shield 104 to rotor 106 in process P102, bolts 120 may be removed from the plurality of apertures 122 positioned on lower portion 110 of gas shield 104. By removing bolts 120, lower portion 110 of gas shield 104 may no longer be coupled to housing 102 of generator system 100, and may only be coupled to rotor 106, such that lower portion 110 may freely rotate with rotor 106. The rotating of rotor 106 and lower portion 110 of gas shield 104 may include manually turning a turning gear (not shown) of rotor 106. More specifically, as shown in FIG. 11, rotor 106, and in turn, lower portion 110 of gas shield 104, may be rotated 180 degrees by user (e.g., generator operator) turning a turning gear of rotor 106 to position lower portion 110 substantially above rotor 106.

Finally, after rotating rotor 106 and lower portion 110 of gas shield 104 in process P106, in process P108 lower portion 110 of gas shield 104 may be uncoupled from rotor 106 of generator system 100. In an embodiment, lower portion 110 of gas shield 104 may be uncoupled from rotor 106 by uncoupling lower portion 110 from first support 134. More specifically, lower portion 110 of gas shield 104 may be uncoupled from rotor 106 by removing bolts 118 positioned within a plurality of slot apertures 148 of first support 134 and the plurality of apertures 116 positioned on lower portion 110 of gas shield 104. Once bolts 118 are removed from first support 134 and lower portion 110 of gas shield 104, respectively, lower portion 110 of gas shield 104 may be removed from generator system 100 in a substantially similar fashion as upper portion 108, as described in process P100. In an alternative embodiment, lower portion 110 of gas shield 104 may be uncoupled from rotor 106 by uncoupling first support 134 from rotor 106. More specifically, lower portion of gas shield 104 may be uncoupled from rotor 106 by removing bolts 132 positioned within at least one rotor hole 140 of first end 136 of first support 134 and the plurality of rotor apertures 130 positioned on support ring 128 of rotor 106. Once bolts 132 are removed, lower portion 110 of gas shield 104 and first support 134, still coupled to lower portion 110 of gas shield by bolts 118, may be removed from generator system 100. After lower portion 110 of gas shield 104 and first support 134 are removed from generator system 100, first support 134 may be removed from lower portion 110 of gas shield by removing bolts 118 from a plurality of slot apertures 148 of first support 134 and the plurality of apertures 116 positioned on lower portion 110.

It is understood that the removal process illustrated in FIG. 7 and described herein may be reversed for re-installing gas shield 104 to housing 102 of generator system 100. That is, an uncoupled upper portion 108 and lower portion 110 of gas shield 104 may be coupled to housing 102 of generator system 100 by following processes P100-P108 in reverse order.

The removal process of gas shield 104 from generator system 100 may be performed so a user (e.g., generator operator) may perform maintenance on the components of generator system 100. The removal process illustrated in FIG. 7 may allow users of generator system 100 to easily, safely and quickly remove gas shield 104 from housing 102 to perform maintenance operations on generator system 100. In comparison to conventional removal procedures of gas shield 104, the removal process illustrated in FIG. 7 and described herein, may take a fraction of the removal time for removing gas shield 104. By decreasing the removal and/or reinstallation time of gas shield 104, the generator system 100 may only be shut down for a short period of time for necessary maintenance. This, in part, allows generator system 100 to begin to generate power more quickly after performed maintenance. Additionally, the removal process illustrated in FIG. 7 and described herein may not require a user to be positioned between lower portion 110 of gas shield 104 and generator system 100 during the removal of lower portion 110 from generator system 100. By not requiring the user to be positioned under gas shield 104 during removal of lower portion 110, the user minimizes safety risks that may be associated with removing gas shield 104 from generator system 100.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator gas shield support device of a generator system, the generator gas shield support device comprising:
a first support coupled to a generator rotor of the generator system, the first support configured to releasably couple a first portion of a generator gas shield to the generator rotor of the generator system,
wherein the first support includes a first end coupled to the generator rotor and a second end, opposite the first end, coupled to a plurality of apertures on the first portion of the generator gas shield during nonoperation of the generator system.

2. The support device of claim 1,
wherein the second end is positioned in a non-planar alignment with the first end of the first support.

3. The support device of claim 2, wherein the plurality of apertures on the first portion of the generator gas shield are configured to couple a joint plate to the first portion of the generator gas shield during operation of the generator system.

4. The support device of claim 1, wherein the first end of the first support is coupled to at least one of a plurality of rotor apertures of the generator rotor, the at least one of the plurality of rotor apertures configured to couple at least one of a plurality of fan blades to the generator rotor during operation of the generator system.

5. The support device of claim 1, further including a second support releasably coupled to the generator rotor and configured to support the first portion of the generator gas shield during a rotation of the generator rotor.

6. The support device of claim 5, wherein the second support includes a first end coupled to the generator rotor.

7. The support device of claim 6, wherein the first end of the second support includes an arc profile substantially similar to an arc profile of a portion of the generator rotor.

8. The support device of claim 6, wherein the second support includes a substantially curved second end configured to abut an inner edge of the first portion of the generator gas shield.

9. The support device of claim 8, wherein the substantially curved second end of the second support includes an arc profile substantially similar to an arc profile of a portion of the inner edge of the first portion of the generator gas shield.

10. The support device of claim 1, wherein the first portion of the generator gas shield is positioned substantially below a longitudinal axis of the generator rotor during nonoperation of the generator system.

11. A method of removing a generator gas shield from a generator system during nonoperation of the generator system, the method comprising:
removing a first portion of the generator gas shield from the generator system, the first portion positioned substantially above a longitudinal axis of a generator rotor of the generator system;

releasably coupling a second portion of the generator gas shield to the generator rotor of the generator system using a first support of a generator gas shield support device, the second portion positioned substantially below the longitudinal axis the generator rotor of the generator system;

uncoupling the second portion of the generator gas shield from the housing of the generator system;

rotating the generator rotor and the second portion of the generator gas shield to position the second portion of the generator gas shield substantially above the longitudinal axis of the generator rotor of the generator system; and uncoupling the second portion of the generator gas shield from the generator rotor of the generator system.

12. The method of claim 11, further comprising removing a plurality of fan blades coupled to the generator rotor of the generator system prior to the removing of the first portion of the generator gas shield.

13. The method of claim 11, further comprising:

coupling a second support to the generator rotor prior to the rotating of the generator rotor and the second portion of the generator gas shield, wherein the second support is configured to support the second portion of the generator gas shield during the rotating of the generator rotor and the second portion of the generator gas shield.

14. The method of claim 11, wherein the rotating of the generator rotor and the second portion of the generator gas shield includes manually turning a turning gear of the generator rotor.

15. The method of claim 11, further comprising removing a joint plate coupling the first portion of the generator gas shield to the second portion of the generator gas shield prior to the removing of the first portion of the generator gas shield.

16. The method of claim 15, wherein the releasably coupling of the second portion of the generator gas shield to the generator rotor of the generator system includes:

replacing the joint plate coupled to the second portion of the generator gas shield with the first support; and coupling the first support to the generator rotor of the generator system.

17. A generator system comprising:

a housing;

a generator gas shield releasably coupled to the housing;

a generator rotor positioned within the housing and passing through the gas shield; and a generator gas shield support device coupled to the generator rotor, the generator gas shield support device including:

a first support coupled to the generator rotor of the generator system, the first support configured to releasably couple a first portion of the generator gas shield to the generator rotor, wherein the first support includes a first end coupled to the generator rotor and a second end, opposite the first end, coupled to a plurality of apertures on the first portion of the generator gas shield during nonoperation of the generator system.

18. The generator system of claim 17, wherein the plurality of apertures on the first portion of the generator gas shield are configured to couple a joint plate to the first portion of the generator gas shield during operation of the generator system.

19. The generator system of claim 17, wherein the first support is coupled to at least one of a plurality of rotor apertures of the generator rotor, the at least one of the plurality of rotor apertures configured to couple at least one of a plurality of fan blades to the generator rotor during operation of the generator system.

20. The generator system of claim 19, further including:

a second support releasably coupled to the generator rotor and configured to support the first portion of the generator gas shield during a rotation of the generator rotor, wherein the second support is coupled to at least one of the plurality of rotor apertures, distinct from the at least one of the plurality of rotor apertures coupling the first support to the generator rotor.

* * * * *